No. 636,281. Patented Nov. 7, 1899.
J. B. O'CONNOR.
MILK PASTEURIZING APPARATUS.
(Application filed July 15, 1899.)
(No Model.)
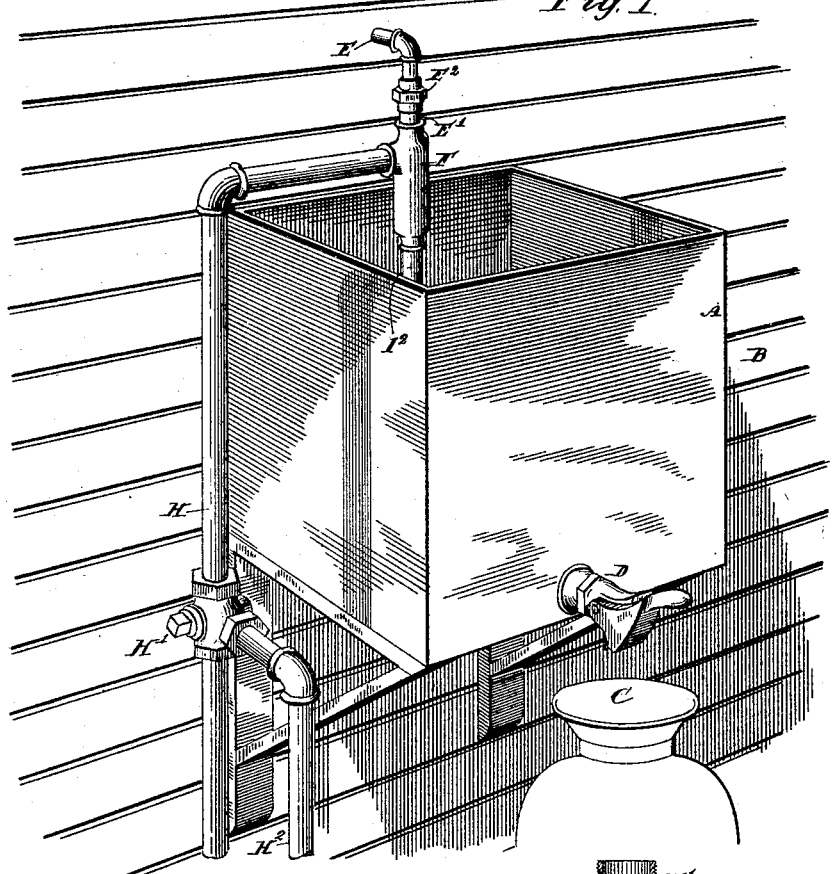
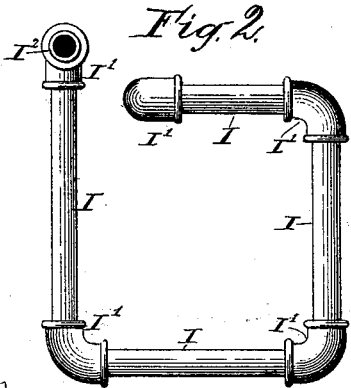
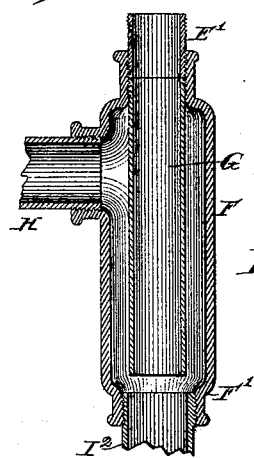
Attest.
Jos. Kulicek
Chas. A. Scott
Inventor
John B. O'Connor
By J. M. St. John
Atty.

UNITED STATES PATENT OFFICE.

JOHN B. O'CONNOR, OF TRAER, IOWA.

MILK-PASTEURIZING APPARATUS.

SPECIFICATION forming part of Letters Patent No. 636,281, dated November 7, 1899.

Application filed July 15, 1899. Serial No. 724,009. (No model.)

*To all whom it may concern:*

Be it known that I, JOHN B. O'CONNOR, a citizen of the United States, residing at Traer, in the county of Tama and State of Iowa, have invented certain new and useful Improvements in Milk-Pasteurizing Apparatus; and I do hereby declare the following to be a full, clear, and exact description of the invention, such as will enable others skilled in the art to which it appertains to make and use the same.

This invention relates to the preservation of liquids, more particularly skimmed milk, for a limited time by a heating process; and the invention consists in the apparatus hereinafter described for effecting this heating operation by the use of steam.

In the accompanying drawings, forming a part of this specification, Figure 1 is a view in perspective of apparatus embodying my invention as in use. Fig. 2 is a plan view of the outlet-coil. Fig. 3 is a longitudinal section of the heating-nozzle in a plane central to the steam-inlet pipe.

Similar letters of reference indicate corresponding parts.

In the operation of creameries it is the custom to return to the patrons of the creamery the skimmed milk, to be used by them as food for swine and other animals. For this reason it is desirable to keep it sweet as long as possible. It is possible to keep it sweet and wholesome until the following day, which is as long as is commonly necessary, by subjecting it to the action of steam, whereby it is thoroughly heated. The apparatus whereby I accomplish this result will now be described.

In the drawings, A denotes a tank placed outside a creamery B, so as to be accessible to the patrons of the creamery in filling their cans C. For this purpose the tank is provided with a suitable gate or faucet D. The tank is of sufficient size to hold a considerable body of milk, so that the milk may flow into it uninterruptedly while the patrons are necessarily interrupted in the operation of filling their cans and one patron making way for another. This tank is supplied from a pipe E, leading to a pump, elevated tank, or other suitable source inside the building. This source of supply forms no necessary part of my invention except in combination therewith, and as I claim no novelty in its construction it has not been thought necessary to illustrate it. The outer end of the pipe E connects with the upper end of a heating-nozzle F, set over the tank, as shown. Just below the pipe E is a tube G, forming practically a continuation thereof and extending to near the lower end of the heater F, as shown in Fig. 3. In practice the inner tube is made of some non-corroding metal, as brass or galvanized iron, and screwed from below into the neck of the heater, near the upper end. Into the upper end is screwed the nipple E', forming the terminus of the pipe E and connecting to it by a suitable union E².

H is a pipe leading to a steam-supply—as, for example, the exhaust-port of an engine. (Not shown.) This pipe enters the side of the mixer near the upper end and is of considerably larger diameter than the milk-outlet pipe E. Where exhaust-steam is used, the pipe should be provided with a three-way cock H' or the like, whereby the flow of steam may be cut off from the heater when not so required and pass through the exhaust-outlet H².

The escape of the commingled milk and steam from the heater is dependent to a considerable extent upon the temperature outside the building. When the weather is very warm, the escape may be direct from the heater. In cold weather, however, the steam is kept longer in contact with the milk, so as to maintain the proper temperature, and this I accomplish by the use of a coil I, formed of a number of short lengths of pipe, preferably of the same size as the main steam-pipe H, connected by elbows I'. The vertical section I² screws into the lower end of the heater. By forming the coil of short lengths in the manner indicated it is possible to secure the required extension of the heater-outlet within the confines of the tank, and it also enables the operator to disconnect it at times and clean it out. In practice there is a continual tendency on the part of the heated milk to collect inside the pipe, and this must from time to time be scraped out, which the construction described admits of being easily and quickly done.

It will be observed that the milk flows downward through the center of the steam-jet until near the lower end of the heating-nozzle and in a comparatively small stream. The milk-outlet being a considerable distance below the steam-inlet the steam is all made to escape from the lower end rather than to back up into the milk-pipe, as it would do except for this downward extension. This would at times be a source of considerable annoyance, as experience at first showed. The construction is such, moreover, as to bring a relatively large body of steam into proximity with a small stream of milk, completely surrounding it, in fact, until commingled with it below the milk-outlet G. At this point the body of the heater F is somewhat constricted, forming a throat F' to take the pipe I². By this means the steam in its outward passage is converged toward the center of the stream of milk and is so incorporated with it as to raise its temperature to the required degree.

Having thus described my invention, what I claim as new, and desire to secure by Letters Patent, is—

1. A milk-pasteurizing device comprising a practically cylindrical heater with a constricted lower end, a steam-pipe entering said heater at the side and near the upper end a milk-pipe entering the same at the center of the upper end, and a central tube forming a continuation of the milk-pipe, terminating a little above the constricted portion of the heater, substantially as and for the purpose set forth.

2. A milk-pasteurizing device comprising a cylindrical heater having a somewhat constricted lower end, a steam-pipe entering said heater at the side and near the upper end a central milk-outlet extending from the upper end to near the mouth at the lower end, a milk-pipe communicating therewith, and an outlet-coil composed of short sections of pipe and connecting-elbows, substantially as described.

3. A milk-pasteurizing device comprising a cylindrical heater, a steam-pipe entering the same at one side near the upper end, a central milk-outlet entering the upper end of the heater and extending to near the lower end thereof, a tank adapted to receive the heated milk as discharged from the heater, and means for controlling the flow of milk and steam and for drawing off the heated milk from said tank, substantially as described.

In testimony whereof I affix my signature in presence of two witnesses.

JOHN B. O'CONNOR.

Witnesses:
DAVID M. STUART,
JOHN HILD.